(12) United States Patent
Watkins, III et al.

(10) Patent No.: US 11,463,774 B2
(45) Date of Patent: Oct. 4, 2022

(54) SYSTEMS AND METHODS FOR DYNAMIC VOICE REMOTE TO CONTROL MEDIA DEVICES

(71) Applicant: DISH Network L.L.C., Englewood, CO (US)

(72) Inventors: Raymond F. Watkins, III, Colorado Springs, CO (US); Adam Porter, Centennial, CO (US); David Michael Downing, Castle Pines, CO (US); Chad Mullen, Parker, CO (US); Jordan Oyler Nhem, Lakewood, CO (US); Tanya Mazur, Littleton, CO (US)

(73) Assignee: DISH Network L.L.C., Englewood, CO (US)

(*) Notice: Subject to any disclaimer, the term of this patent is extended or adjusted under 35 U.S.C. 154(b) by 111 days.

(21) Appl. No.: 16/904,485

(22) Filed: Jun. 17, 2020

(65) Prior Publication Data

US 2021/0400350 A1    Dec. 23, 2021

(51) Int. Cl.
| | |
|---|---|
| *G06F 3/00* | (2006.01) |
| *G06F 13/00* | (2006.01) |
| *H04N 5/445* | (2011.01) |
| *H04N 21/472* | (2011.01) |
| *H04N 21/422* | (2011.01) |
| *H04N 21/478* | (2011.01) |
| *H04N 21/45* | (2011.01) |
| *H04N 21/475* | (2011.01) |
| *G10L 15/22* | (2006.01) |

(52) U.S. Cl.
CPC ........... *H04N 21/472* (2013.01); *G10L 15/22* (2013.01); *H04N 21/42203* (2013.01); *H04N 21/4532* (2013.01); *H04N 21/478* (2013.01); *H04N 21/4753* (2013.01)

(58) Field of Classification Search
CPC .......... H04N 21/472; H04N 21/42203; H04N 21/4532; H04N 21/4753; H04N 21/478; G10L 15/22
See application file for complete search history.

(56) References Cited

U.S. PATENT DOCUMENTS

| | | | | |
|---|---|---|---|---|
| 2007/0260603 | A1* | 11/2007 | Tuscano | G06F 16/9535 |
| 2010/0158205 | A1* | 6/2010 | Dhawan | H04M 1/2478 |
| | | | | 379/88.01 |
| 2013/0036367 | A1* | 2/2013 | DeRoos | G06F 9/451 |
| | | | | 715/745 |

(Continued)

*Primary Examiner* — Kyu Chae
(74) *Attorney, Agent, or Firm* — Seed Intellectual Property Law Group LLP

(57) ABSTRACT

A context-driven voice-control system and method for enabling users to control customer service activities related to live broadcast programming, recorded programming, streaming programming, and on-demand programming using vocal selection by the user. The context-driven voice-control system and method may also enable users to control one or more of account management activities using vocal selection by the user, authentication to authorize changes to their account using vocal selection by the user, and troubleshooting of equipment and system capabilities using vocal selection by the user. The context-driven voice-control system and method dynamically generates and presents a list of available control and support pathways to a user based on the user attributes and the voice control requests.

24 Claims, 5 Drawing Sheets

(56) References Cited

U.S. PATENT DOCUMENTS

| | | | |
|---|---|---|---|
| 2013/0094633 A1* | 4/2013 | Mauro | G06F 3/0482 |
| | | | 379/88.01 |
| 2017/0061443 A1* | 3/2017 | Wolf | H04N 21/6143 |
| 2019/0045042 A1* | 2/2019 | Rettig | H04W 4/80 |
| 2019/0050239 A1* | 2/2019 | Caldwell | G06F 11/079 |
| 2019/0378500 A1* | 12/2019 | Miller | G06F 3/167 |
| 2020/0219505 A1* | 7/2020 | Hatambeiki | G06F 3/167 |

* cited by examiner

SYSTEMS AND METHODS FOR DYNAMIC VOICE REMOTE TO CONTROL MEDIA DEVICES

TECHNICAL FIELD

The present disclosure relates to controlling media context, and particularly to controlling media context using voice commands.

BACKGROUND

Being able to seamlessly control and watch live broadcast, recorded, streaming and on-demand programming anywhere that one has a television (TV) or mobile device is becoming an increasingly sought out feature for home entertainment systems. One solution provides a main television receiver (such as a set-top box provided by a cable or satellite television service provider) that is connected to the cable or satellite television service provider and that serves as the interface between the backend cable or satellite television service provider system and the home entertainment system on the customer premises. Connected to this television receiver are a number of other receiving devices (player devices) each connected to respective TVs throughout the customer premises. For example, the player devices may be connected to the television receiving device via a home local area network (LAN) and communicate over the LAN with the television receiving device using the transmission control protocol/Internet protocol (TCP/IP) suite of networking communication protocols. These player devices are able to play on their respective TVs the live broadcast, recorded, streaming and on-demand programming initially received by the television receiving device from the cable or satellite television service provider or other content provider.

As one example, Video on Demand (VOD) is a system which allows a user to select, watch and/or listen to video and audio content on demand. For example "Internet Television" and "Internet Protocol Television" (IPTV) are systems through which various media content is delivered using the Internet protocol (IP) suite over a packet-switched network such as the Internet or a LAN, instead of being delivered through traditional channels using terrestrial, satellite signal, and cable television formats. In such situations, the device used to initially receive the content may be the television receiving device (e.g., set-top box) provided by the cable provider, satellite provider, or other program distributor to which the customer subscribes for such on-demand services. The various player devices on the customer premises in communication with the television receiving device may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services.

There is also a growing desire to be able to control and watch live broadcast, recorded, streaming and on-demand programming using voice commands, as well as providing service, support, and troubleshooting functions using voice commands. However, current voice control capabilities are quite limited. These systems typically merely convert voice to text and perform a generic word search, without any intelligence or customization to individual users, accounts, or devices. As such, these current voice control systems can be very frustrating to users and leave much to be desired.

There is a continuing need for a system that provides enhanced voice control capabilities over audio/visual components and media content. The present disclosure addresses this and other needs.

BRIEF SUMMARY

Briefly stated, embodiments described herein are directed towards a context-driven voice-control system and method for enabling users to control customer service activities related to live broadcast programming, recorded programming, streaming programming, and on-demand programming using vocal selection by the user. In other embodiments, the context-driven voice-control system and method enables users to control one or more of account management activities using vocal selection by the user, authentication to authorize changes to their account using vocal selection by the user, and troubleshooting of equipment and system capabilities using vocal selection by the user.

In one or more embodiments, a method for context-driven voice-control using an application control interface, includes gathering user attributes for use in a voice control session; receiving a voice control request from a user during the voice control session; dynamically generating and presenting a list of available control and support pathways to a user based on the user attributes and the voice control requests; in response to a vocal selection by a user of an available control and support pathways, presenting stages sequentially to the user, each stage having a list of actions that the user can select to facilitate resolution to the user's voice control request; in response to receiving a vocal selection of an action in the voice control session, updating the stages sequentially presented to the user in the available control and support pathways to facilitate resolution to the user's voice control request; and in response to receiving a vocal selection of an action in the voice control session, sending an authorization signal via an external system to perform a function related to the vocally selected action.

In some embodiments, user attributes include one or more of packages subscribed to by the user, tenure of the user, payment history of the user, user equipment undergoing troubleshooting, and the like. In another aspect of some embodiments, the method also includes enabling users to add a support application via a voice assistant associated application store. In still another aspect of some embodiments, the method further includes, authenticating the user to enable account specific features, after installation of the voice assistant associated application. In yet another aspect of some embodiments, the method further includes, prompting users with a standard greeting and asking users to provide a description of a current issue of interest to the user. In other aspects of some embodiments, the method further includes receiving the vocal selection by the user of a search result that most closely matches the current issue of interest to the user.

In other embodiments, a context-driven voice-control system using an application control interface includes one or more processors and a memory device storing a set of instructions that, when executed by the one or more processors, causes the one or more processors to: gather user attributes for use in a voice control session; receive a voice control request from a user during the voice control session; dynamically generate and present a list of available control and support pathways to a user based on the user attributes and the voice control requests; in response to a vocal selection by a user of available control and support pathways, present stages sequentially to the user, each stage having a list of actions that the user can select to facilitate resolution to the user's voice control request; in response to receiving a vocal selection of an action in the voice control session, update the stages sequentially presented to the user in the available control and support pathways to facilitate resolution to the user's voice control request; and, in response to receiving a vocal selection of an action in the voice control session, send an authorization signal via an external system to perform a function related to the vocally selected action.

In some embodiments, the system verbally leads the user along a control and support pathway to resolve a customer service issue with sequential stages, each stage having a list of vocally selectable actions by the user. In another aspect of some embodiments, the system enables users to skip stages or add additional stages based on logic defined by one or more of user attributes and the vocal selections by the user. In still another aspect of some embodiments, the system records stages taken and actions selected by the user on the control and support pathway, upon completion of the vocally selected control and support pathway. In yet another aspect of some embodiments, the system leverages the record of stages taken and actions selected by the user for future use with technical support to help expedite troubleshooting.

In some embodiments of the context-driven voice-control system, if the user's voice control request has not been resolved, the system provides escalation paths that include one or more of: present a customer support phone number, present a customer support email address, and offer to connect the user with a live agent. In another aspect of some embodiments of the context-driven voice-control system, visibility of available control and support pathways to the user is driven by permissions to access rights of the user. In still another aspect of some embodiments, the context-driven voice-control system further includes a context manager that manages permissions and logic sets. The permissions control the visibility of available control and support pathways to the user and category visibility to the user. The logic sets control action visibility to the user. In yet another aspect of some embodiments, the context-driven voice-control system also includes using a front end user interface that enables users to identify an appropriate control and support pathway that addresses a current issue of interest to the user via browsing a list of available control and support pathways to the user.

In still other embodiments, a method for context-driven voice-control using an application control interface includes: enabling a user to initiate a voice control session; gathering user attributes for use in the voice control session; receiving voice control requests from a user during the voice control session; executing a search and dynamically generating control and support pathways that are available to a user based on the user attributes; presenting a list of available control and support pathways to a user based on the user attributes and the voice control requests; receiving a vocal selection, by the user, of an available control and support pathway; after the available control and support pathway is vocally selected, presenting stages sequentially to the user, each stage having a list of actions that the user can select; in response to receiving a vocal selection of an action in the voice control session, updating the stages sequentially presented to the user in the available control and support pathway; and in response to receiving a vocal selection of an action in the voice control session, sending an authorization signal via an external system to perform a function related to the vocally selected action.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Each of the features and teachings disclosed herein may be utilized separately or in conjunction with other features and teachings to provide a context-driven voice-control system and method 100. Representative examples utilizing many of these additional features and teachings, both separately and in combination, are described in further detail with reference to the attached FIGS. 1-4. This detailed description is intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In some embodiments, the context-driven voice-control system and method 100 includes an application program interface that enables users to control certain customer service activities with respect to live broadcast, recorded, streaming and on-demand programming using vocal commands in a customer service control system. To support this voice control system, a user adds a voice support application via a voice assistant application store or via other methods supported by their platform to their receiving device, remote control, mobile device, or player device. After installation of this voice support application, the user authenticates itself with the context-driven voice-control system to enable account specific features. In one or more implementations, users are prompted with a standard greeting when initiating a voice control session.

Figure 1:
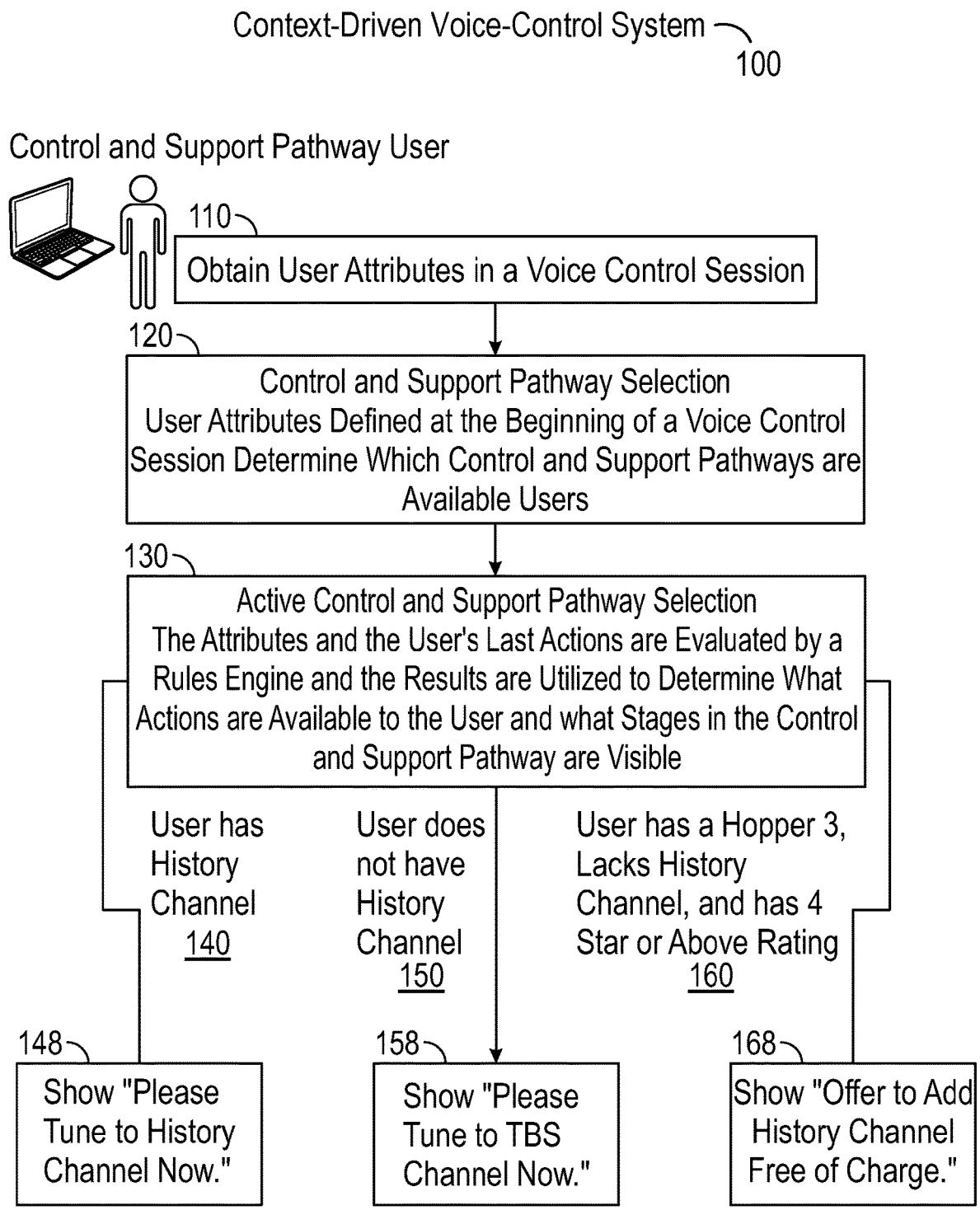
FIG. 1 is a logical flow diagram illustrating the rules engine of the context-driven voice-control system and method, according to one example embodiment.

Referring to FIG. 1, the context-driven voice-control system and method 100 also obtains and establishes many user attributes at the beginning of a voice control session, at 110. In various embodiments, a voice control session may be initiated using the receiving device, remote control, mobile device, or player device to capture the user's voice. These attributes include, by way of example only, and not by way of limitation: channels subscribed to by the user, types of voice control request that can be taken, length of time as a user, user status (e.g., VIP, star rating, or other elevated status), promotional offers available to the user account, equipment on the user account, and line(s) of business associated with the user. In some embodiments, these user attributes defined at the beginning of the voice control session determine which control and support pathways are available to users via voice control, as well as what categories are available to users via voice control, at 120. These available control and support pathways are then presented to the user. The user's attributes established during the voice control session and the user's last actions are evaluated by a rules engine, at 130. In some embodiments, the rules engine is powered by a binary expression tree. The results are utilized to determine what actions are available to the user, as well as what stages in the control and support pathways are visible to the user.

At this point, in one example of the context-driven voice-control system 100 shown in FIG. 1, three different control and support pathways 140, 150, and 160 are possible, depending on the attributes of the user. In this embodiment, if the user has attributes that include the channel subscription for the History Channel, then control and support pathway 140 is selected and the message "Please tune to the History Channel now" is displayed, at 148, on a presentation device (e.g., television). In another embodiment, the presentation device (e.g., television) may automatically have the channel switched to the History Channel by a command from the system 100. Continuing, if the user has attributes that do not include the channel subscription of the History Channel, then the control and support pathway 150 is selected and the message "Please tune to the TBS channel now" is displayed, at 158, on a presentation device (e.g., television). In another embodiment, the presentation device (e.g., television) may automatically have the channel switched to the TBS channel by a command from the system 100. Finally, in this embodiment, if the user has attributes that do not include the channel subscription of the History Channel, but the user has a Hopper 3, and a star rating of 4 stars or above, then the control and support pathway 160 is selected and the message "Office to add the History Channel free of charge" is displayed, at 168, on a presentation device (e.g., television). It should be noted that in this embodiment, only the user attributes were used to determine what control and support pathways were available to the user. In other embodiments, both the user attributes and the voice control request of the user are used to determine what control and support pathways were available to the user.

In another aspect of some embodiments, the context-driven voice-control system 100 then asks the user to provide a description of current issue of interest. After receiving a response from the user to this inquiry, the context-driven voice-control system 100 executes a search using a rules engine is powered by a binary expression tree, and then provides a list of available control and support pathways to the user as results. After reviewing the list of results, the user selects an available control and support pathway from the list of results that most closely matches the issue they are experiencing. The context-driven voice-control system 100 then verbally leads the user along a control and support pathway to resolve a customer service issue with sequential stages.

Notably, the context-driven voice-control system and method 100 provides a list of available control and support pathways that is dynamically driven by context. The user of the context-driven voice-control system 100 then vocally selects an available control and support pathway that best addresses the user's issue (e.g., television signal is "fuzzy," trouble switching input signal, trouble with audio signal, trouble with display parameters, trouble with closed captioning, trouble searching programming, and the like). After the available control and support pathway is vocally selected by the user, the context-driven voice-control system 100 presents stages sequentially to the user. Each stage has a list of actions that the user can select to help resolve the current user issue. In response to receiving a vocal selection of an action in the voice control session, the context-driven voice-control system 100 updates the stages that are sequentially presented to the user. Additionally, the context-driven voice-control system 100 may also send an authorization signal via an external system to perform a function related to the vocally selected action, in response to receiving a vocal selection of an action in the voice control session. In one aspect of some embodiments, the context-driven voice-control system and method 100 may enable the users to skip stages or add additional stages based on logic defined by a context management team using the user's attributes.

In one or more embodiments, the context-driven voice-control system and method 100 includes a user front end interface that enables agents or customers to quickly identify an appropriate control and support pathway that fits with the issue that the user is facing by searching a list of available support pathways. Notably, the available control support pathways and categories are dynamic generated, meaning that the available control support pathways and categories presented to the user vary depending on the user's attributes, as well as the voice control request made by the user. In one or more embodiments, visibility of the available control and support pathways presented on the results list is driven by permissions created by the context-driven voice-control system 100. The permissioning system of the context-driven voice-control system 100 is configured to support any number of data sources, which drives rules on rights accessibility.

Once a control and support pathways is vocally selected in the context-driven voice-control system 100, stages are presented one at a time to the user. Each stage includes a list of actions that the user can select. Notably, in some embodiments of the context-driven voice-control system 100, actions in the control and support pathways that are available to the user are dynamically generated based on user attributes gathered in that session (e.g., packages subscribed to by the user, tenure of the user, payment history of the user, user equipment undergoing troubleshooting, and the like). In this manner, the action vocally selected by the user determines what the next available actions presented on the user front end interface will be. Additionally, the action vocally selected by the user determines what stage is be shown next to the user. In another aspect of context-driven voice-control system 100, actions also have the ability to perform additional functions beyond determining what stage to show next, as well as interface with external systems. For example, in some embodiments, an action sends an authorization signal via an external system, as well as delivering the user to the next stage in the process. As discussed above, control and support pathways that are available to the user are dynamically generated based on user attributes gathered. Upon completion of the support pathway, all stages performed by the user are saved to the appropriate system, depending on the type of interaction.

In some embodiments, the context-driven voice-control system 100 includes an administrator/context manager front end interface that enables context managers to create, manage, and update all aspects of the context-driven voice-control system's context. In addition to creating new control and support pathways, context managers are also able to manage both permissions (e.g., controlling control and support pathways and category visibility) and logic sets (e.g., controlling action visibility) via an administration tool. The service layer of the context-driven voice-control system and method 100 contains all functions needed by both front end interfaces (i.e., user front end interface and administrator/context manager front end interface) to operate.

In some embodiments, upon completion of the support pathway by the context-driven voice-control system and method 100, internal records are updated with a note of stages selected by the user on the control and support pathway. In such an embodiment, this record is visible for future use with technical support to help expedite troubleshooting. Upon completion of the control and support pathway by the user in the context-driven voice-control system and method 100, the user may be prompted to confirm resolution of the issue. Alternatively, if the issue has not been resolved, escalation paths may be presented to the user. Such escalation paths may include providing a customer support phone number, providing a customer support email address, or offering to connect the user with a live agent.

Figure 2:
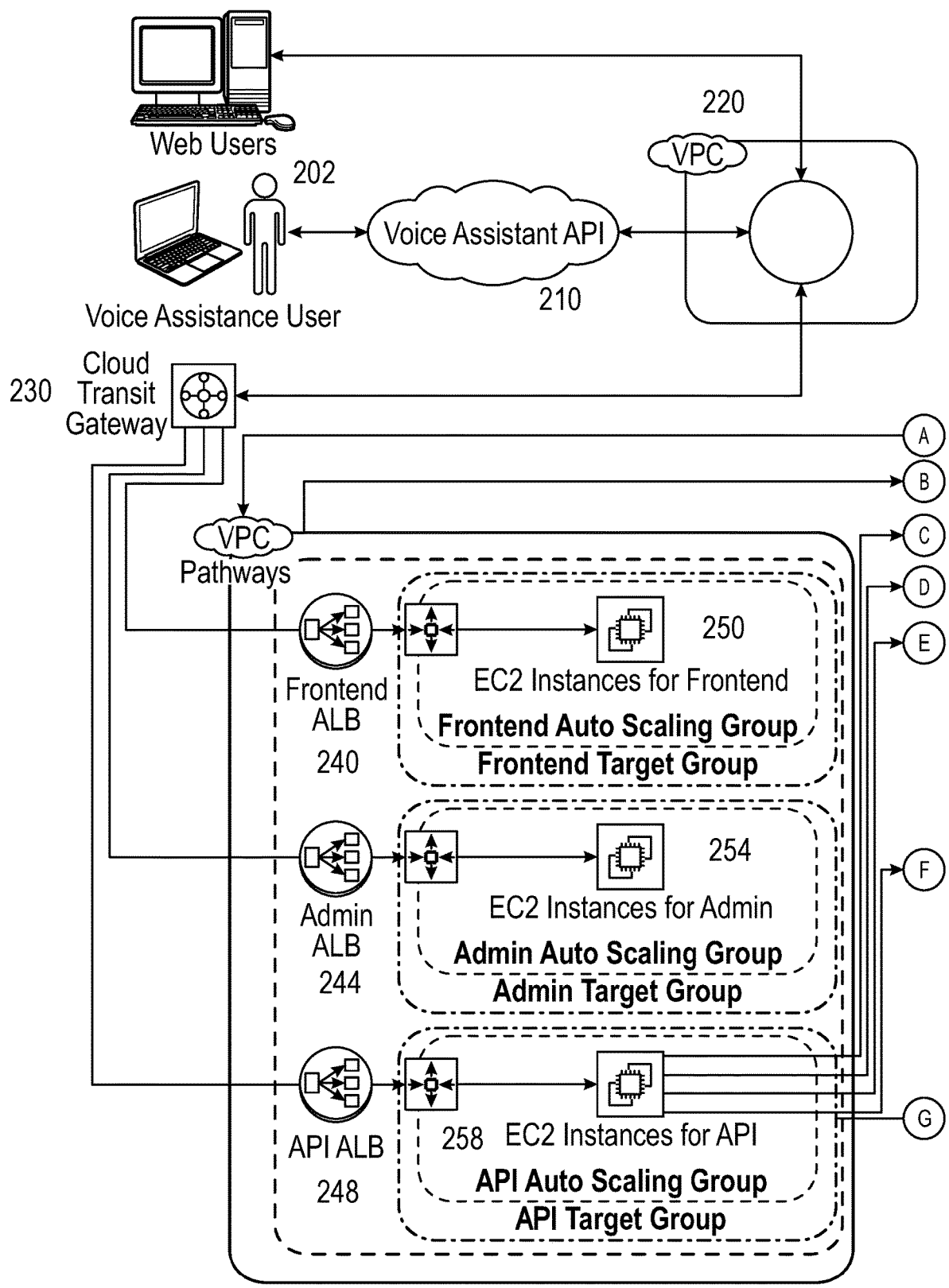
FIG. 2 is an example of the system architecture for the context-driven voice-control system and method, according to one example embodiment.
Figure 2:
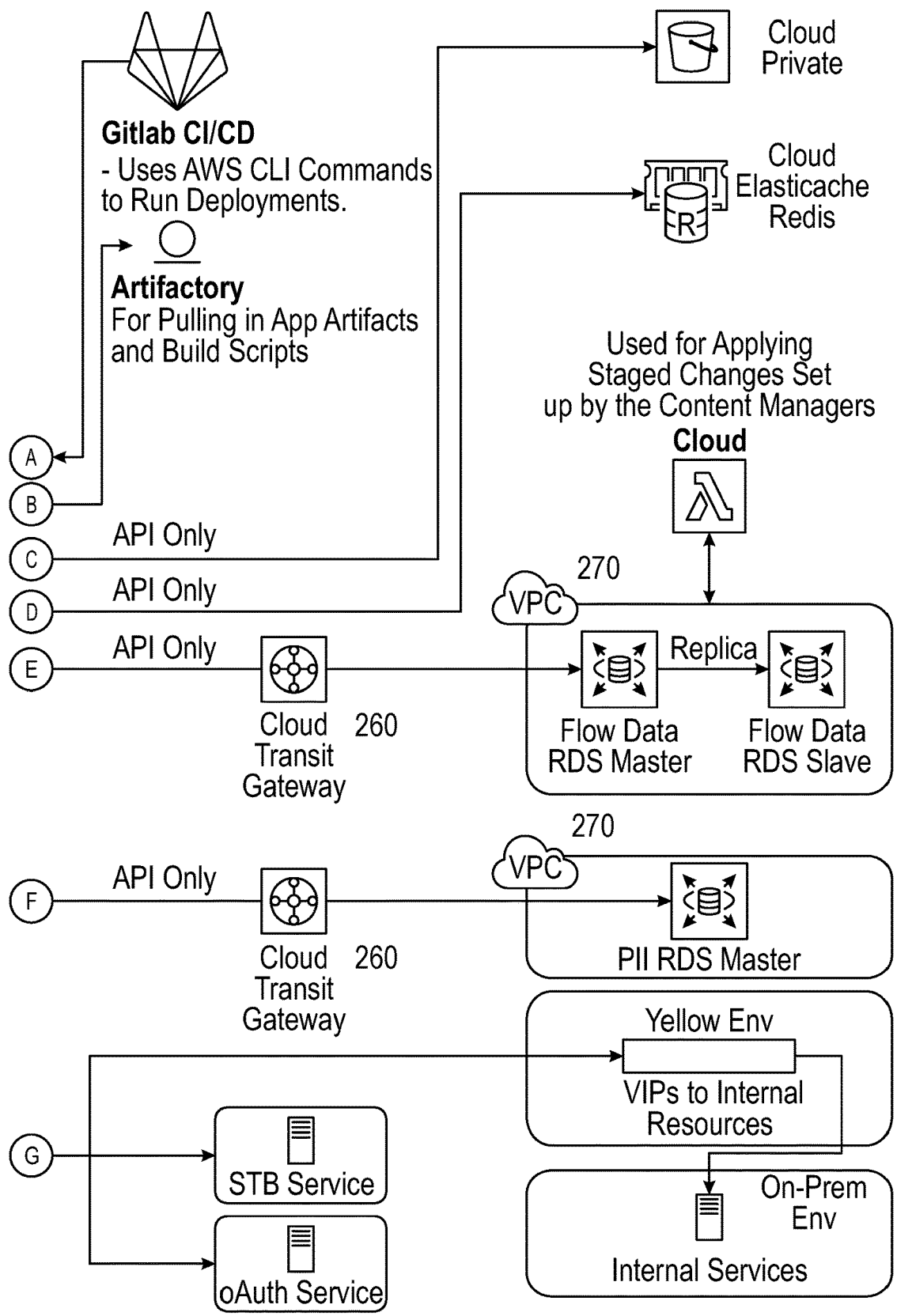

Referring now to FIG. 2, an example system architecture for the context-driven voice-control system and method is shown. In such embodiments, the context-driven voice-control system and method 100 includes a tech stack that is an internally facing single page application (SPA) built using Angular framework for agents. In one or more embodiments, the internally facing single page application is access controlled using Angular framework for administrators and context managers. In some embodiments, a WebAPI RESTful service layer is built using .Net Core. The service layer may be designed using an "API first" based methodology that allows the voice assistant Application Programming Interface (API) 210 to be used with any front end (e.g., web applications, mobile applications, voice assistants, voice controlled remote controller, etc.). In such embodiments, the layers of the tool are cloud deployed via Amazon Web Services or other appropriate cloud service provider (e.g., the information provider 338 in FIG. 3).

As shown in FIG. 2, a voice assistance user 202 may use a voice assistance API 210 to connect to a virtual private cloud 220. The virtual private cloud 220 in turn connects through a cloud transit gateway 230 to a plurality of virtual servers (e.g., Elastic Computer Clouds; EC2s) 250, 254, and 258. The virtual servers 250, 254, and 258 each have respective Application Load Balancer (ALB) 240, 244, 248. The virtual server 250 has instances that include a frontend auto-scaling group and a frontend target group. The virtual server 254 has instances that include an admin auto-scaling group and an admin target group. The virtual server 258 has instances that include an API auto-scaling group and an API target group. The virtual servers further connect to additional cloud transit gateways 260 and virtual private cloud 270.

Figure 3:
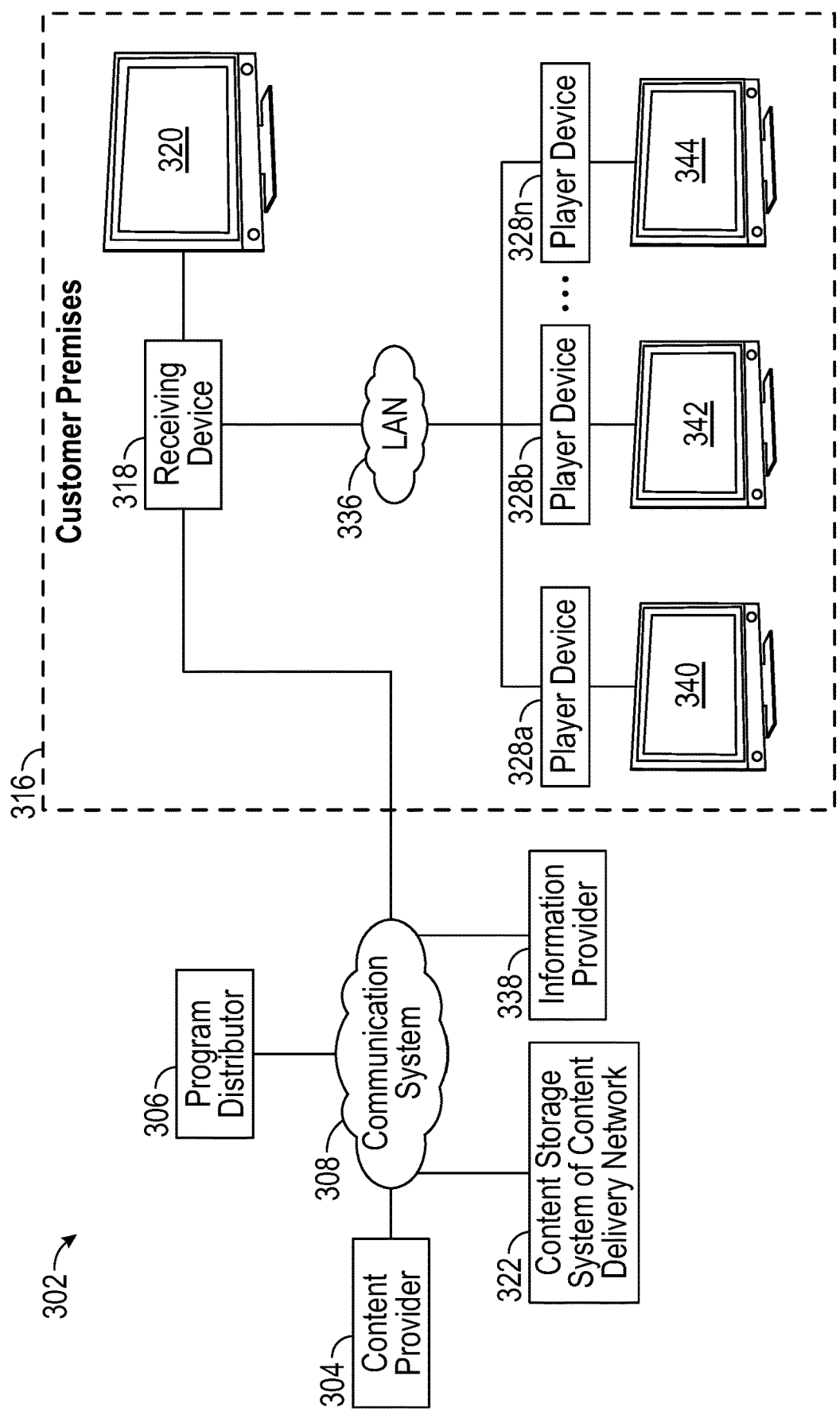
FIG. 3 is an overview block diagram illustrating an example content distribution environment in which a context-driven voice-control system and method may operate, according to one example embodiment.

Referring now to FIG. 3, an overview block diagram is shown illustrating an example content distribution environment 302 in which embodiments of the context-driven voice-control system and method 100 may be implemented, according to one or more embodiments. In addition to providing details regarding the operation and constitution of the context-driven voice-control system and method 100, the example content distribution environment 302, within which such a system may operate, will briefly be described.

In the content distribution environment 302, audio, video, and/or data service providers, such as television service providers, provide their customers a multitude of video and/or data programming (herein, collectively "programming"). Such programming is often provided by use of a receiving device 318 (e.g., in some embodiments referred to as a hopper) communicatively coupled to a presentation device 320 configured to receive the programming. In one or more embodiments, the receiving device 318 is dynamically controlled by the context-driven voice-control system and method 100. The dynamic nature of this voice control refers to how the actions in the control and support pathways that are available to the user are dynamically generated based on user attributes gathered in that session. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

The receiving device 318, which may be dynamically controlled by the context-driven voice-control system and method 100, interconnects to one or more communications media or sources. For example, the various media content may be delivered as data using the IP suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 318 may receive a plurality of programming by way of the communications media or sources, or may only receive programming via a particular channel or source described in greater detail below. In some embodiments, based upon selection by a user, the receiving device 318 processes and communicates the selected programming to the presentation device 320. Also, in some embodiments, the presentation device 320 may also be a receiving device 318 or have a receiving device 318 integrated within it.

Examples of a receiving device 318 may include, but are not limited to, devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 318 may be any suitable converter device or electronic equipment that is operable to receive programming via a connection to a satellite or cable television service provider outside the customer premises and communicate that programming to another device over a network. Further, the receiving device 318 may itself include user interface devices, such as buttons or switches. In some example embodiments, the receiving device 318 may be configured to receive and decrypt content according to various digital rights management (DRM) and other access control technologies and architectures.

Examples of a presentation device 320 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 320 employ a display, one or more speakers, and/or other output devices to communicate video and/or audio content to a user. In many implementations, one or more presentation devices 320 reside in or near a customer's premises 316 and are communicatively coupled, directly or indirectly, to the receiving device 318. Further, the receiving device 318 and the presentation device 320 may be integrated into a single device. Such a single device may have the above-described functionality of the receiving device 318 and the presentation device 320, or may even have additional functionality.

In the example embodiment shown in FIG. 3, a plurality of player devices 328a, 328b, 328n (e.g., wireless Joeys, which are remote media player devices) are communicatively connected to the television receiving device via a home LAN 336 that generally covers only part or all of the customer premises 316. In one or more embodiments, the plurality of player devices 328a, 328b, 328n are dynamically controlled by the context-driven voice-control system and method 100. There may be fewer or additional player devices in various embodiments. Each of the player devices 328a, 328b, 328n communicates over the LAN 336 with the television receiving device using the transmission control protocol/Internet protocol (TCP/IP) suite of networking communication protocols. In various embodiments, all or part of the LAN 336 may be wired or wireless. These player devices are able to receive from the receiving device 318, over LAN 336, and play on their respective connected presentation devices 340, 342, 344, the live broadcast, recorded, streaming and/or on-demand programming initially received by the receiving device 318 from the cable or satellite television service provider. In the present example, the cable or satellite television service provider may encompass or be in communication with some or all of the content provider 304, program distributor 306, content storage system of content delivery network 322, and/or information provider 338.

Television VOD systems may stream content to a receiving device 318 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 316, or download it to a receiving device 318 such as a computer, DVR (also called a personal video recorder) or portable media player for viewing at any time. The receiving device 318 may in turn provide each of the player devices 328a, 328b, 328n access to such content from the receiving device 318 over the home LAN 336, such that each player device 328a, 328b, 328n may play the content on their respective connected presentation devices 340, 342, 344, at various locations throughout the customer premises 316. In some embodiments, the presentation device may be integrated as part of the player device. Also, in some embodiments, a player device may communicate with the receiving device 318 to receive such content remotely via the Internet or otherwise via communication system 308. The program distributor 306 may offer VOD streaming, including pay-per-view and free content, whereby a user buys or selects a movie or television program and it begins to play on the presentation device 320 or on other presentation devices 340, 342, 344 via their respective player devices 328a, 328b, 328n almost instantaneously, downloading of the media content to a DVR rented from the program distributor, and/or downloading the content onto a computer or mobile device, for viewing in the future.

In some embodiments, the receiving device 318 may be a set-top box that is typically provided by the cable provider, satellite provider, or other program distributor 306 to which the customer may subscribe to receive such on-demand services and that also receives programming through traditional channels using a terrestrial, satellite signal, and/or cable television format. The various player devices 328a, 328b, 328n on the customer premises in communication with the receiving device 318 may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services.

Figure 4:
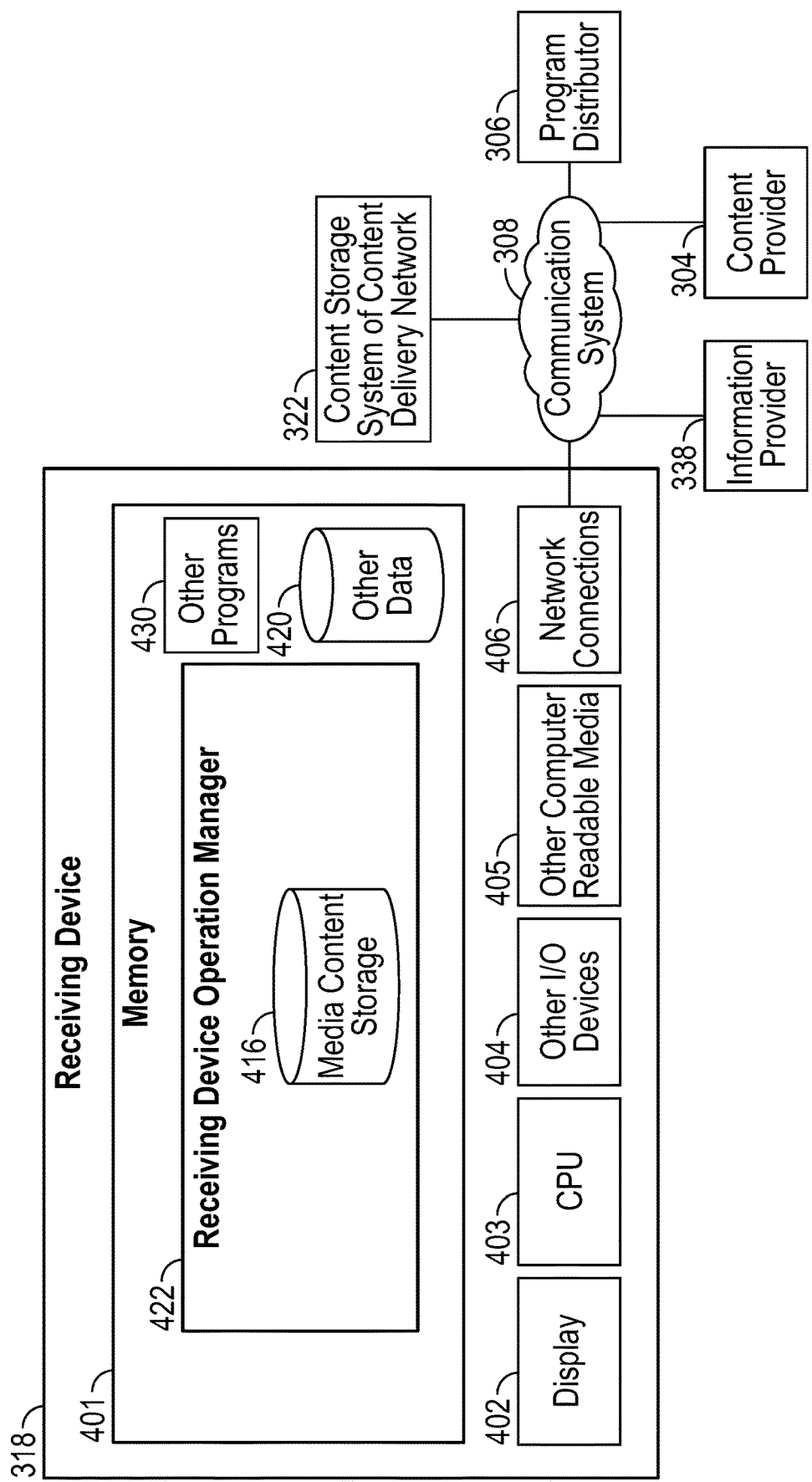
FIG. 4 is a block diagram illustrating elements of an example receiving device used in a context-driven voice-control system and method, according to one example embodiment.

FIG. 4 is a block diagram illustrating elements of an example receiving device 318 used in the context-driven voice-control system and method 100, according to one example embodiment. In one embodiment, the receiving device 318 is a device such as a set-top box, television, DVR, DVD player, PC, tablet device, game machine, smart phone, mobile device or other computing device or media player configured to receive programming via a connection to a satellite or cable television service provider outside the customer premises and to display such programming on a presentation device. For example, the receiving device 318 may be configured to receive, process and display on a presentation device streaming media content received directly from the satellite or cable television service provider and/or other programming received directly from the satellite or cable television service provider such as cable or satellite television broadcasts via various other physical and logical channels of communication.

In the embodiment shown in FIG. 4, receiving device 318 comprises a computer memory ("memory") 401, a display 402 (including, but not limited to, a light emitting diode (LED) panel, cathode ray tube (CRT) display, liquid crystal display (LCD), touch screen display, etc.), one or more Central Processing Units ("CPU") 403, other Input/Output ("I/O") devices 404 (e.g., keyboard, mouse, microphone, RF or infrared receiver, universal serial bus (USB) ports, other communication ports, voice controlled remote controller, and the like), other computer-readable media 405, and network connections 406. The receiving device operation manager 422 is shown residing in memory 401. In other embodiments, some portion of the contents and some, or all, of the components of the receiving device operation manager 422 may be stored on and/or transmitted over the other computer-readable media 405. The components of the receiving device 318 and operation manager 422 (which may include the rules engine) preferably execute on one or more CPUs 403 to: gather user attributes for use in a voice control session; receive a voice control request from a user during the voice control session; dynamically generate and present a list of available control and support pathways to a user based on the user attributes and the voice control request; in response to a vocal selection by a user of an available control and support pathway, present stages sequentially to the user, each stage having a list of actions that the user can select to facilitate resolution to the user's voice control request; in response to receiving a vocal selection of an action in the voice control session, update the stages sequentially presented to the user in the available control and support pathways to facilitate resolution to the user's voice control request; and in response to receiving a vocal selection of an action in the voice control session, send an authorization signal via an external system to perform a function related to the vocally selected action. In other embodiments, the rules engine may be implemented by the Information Provider 338, Program Distributor 306, or some other backend system.

In some embodiments, the receiving device 318 and operation manager 422 include an API (as previous described and as shown in FIG. 2) that provides programmatic access to one or more functions of the receiving device 318 and operation manager 422. For example, such an API may provide a programmatic interface to one or more functions of the receiving device operation manager 422 that may be invoked by one of the other programs 430, a remote control (not shown), the program distributor 306, the content provider 304, information provider 338, content storage system of the content delivery network 322 or some other module. In this manner, the API may facilitate the development of third-party software, such as various different on-demand service applications, user interfaces, plug-ins, adapters (e.g., for integrating functions of the receiving device operation manager 422 and information provider 338 into desktop applications), and the like to facilitate context-driven voice-control of the receiving device 318.

Referring again to FIGS. 1 and 2, in some embodiments of the context-driven voice-control system 100, logic sets, rules, and actions are all evaluated and shown on the front end interface as a user proceeds through a control and support pathway. When creating a category, the context-driven voice-control system and method 100 is able to associate an existing control and support pathway (and its subset of stages) to the category instead of having to create a new control and support pathway. A category can be associated to different lines of businesses. Types of categories may include, by way of example only, and not by way of limitation, troubleshooting, audio, video, channel selection, input selection, and the like.

In another aspect of the context-driven voice-control system 100, a section of "categories" are presented to assist with navigating to a single control and support pathway to begin troubleshooting or other types of support or control functions. Main categories are immediately displayed in the categories section, while selectable subcategories are seen beneath the main categories until only a single control and support pathway is available to choose. In some embodiments, the context-driven voice-control system 100 also includes categories and/or control and support pathways without equipment based permission sets so that users may receive assistance with customer service based issues without extra unnecessary stages.

In one or more embodiments, the context-driven voice-control system 100 includes logic statements that encompass many different use cases to solve problems without the assistance of an information technology department. In another aspect, the context-driven voice-control system and method 100 has control and support pathways and included stages based on any number of different filters to determine how each filter is being utilized. Filters attached to each control and support pathways/stage are visible in an administration/context manager (e.g., all stages tied to a Hopper 3 receiver, all control and support pathways that can be troubleshot by a T3 agent, and the like). In some embodiments, the administration/context manager may be included in or executed by the Receiving Device Operation Manager 422 or Other Programs 430 of FIG. 4.

Notably, in some embodiments, the context-driven voice-control system 100 is able to group stages so that many applicable stages can be added with a single selection. This functionality enables stages to be grouped under their core name and versioning. For example, there may be 15 different versions for the stage "Does Resetting the Receiver Resolve the Issue" because these versions are broken out by distinct receiver model. In another aspect of one or more embodiments, the context-driven voice-control system 100 retrieves the customer's line of business, as well as the devices associated with the line of business, so that a technical support portal can display the appropriate control and support pathways to troubleshoot. Additionally, the context-driven voice-control system 100 may retrieve the customer's type of account so that the technical support portal can display the appropriate control and support pathways to troubleshoot.

In other aspects of some embodiments, the context-driven voice-control system 100 records the number of selections made per action so that this information is available to aid in sorting decisions. For example, "Yes" or "No" is an "action" to the question "Does resetting the receiver resolve the issue?" Furthermore, the context-driven voice-control system 100 also records additional data not already accounted for to provide information to the data warehouse tables. Such data collection may include: end call type codes, call completion stage, receiver number, hash code field for pop-ups, indicate when a control and support pathway are initiated from a pop-up with the pop-up number and hash value, and indicate when a new control and support pathway is started after one has been completed on the same call.

In still another aspect of some embodiments, the context-driven voice-control system 100 retrieves potential known issues impacting the customer to prevent unnecessary troubleshooting. Such information retrieval stages may include: (1) retrieve receiver model in control and support pathway tool; (2) retrieve category of control and support pathway in KI tool to category in control and support pathway tool; (3) pull the number of the known issue, description of the known issue as well as work around description; and (4) retrieve core programming packages, premiums, add-ons, locals, RS Nets, international, SVOD (Subscription based Video On Demand), IP Live Linear, PPV (Pay Per View) to compare to Services.

As described above, some embodiments of the context-driven voice-control system 100 include a context manager that employs permissions that encompass many different use cases, and controls the visibility of available control and support pathways to the user and category visibility to the user. The context manager may also manage logic sets that control action visibility to the user so that only the applicable actions will appear. In some embodiments, the context-driven voice-control system 100 has a back end agent interface that displays header information for each agent facing pop-up/slate/issue. This header information provides more context regarding what caused this issue for the user.

In some embodiments, the context-driven voice-control system 100 is able to associate a default logic set to a stage so that the logic set will autofill in when adding the stage to a control and support pathway. Advantageously, when using the context-driven voice-control system and method 100, potential product known issues are displayed based on the relevant line or business, device/equipment, and category that has been selected. Potential known service issues may be displayed based on the specific programming the customer has, such as PPV (pay-per-view). Additionally, "On Demand" content that is available to be purchased/streamed is presented to anyone who can potentially purchase/download it.

In one or more embodiments, the context-driven voice-control system 100 reveals the first attribute matching stage in a control and support pathway that is applicable to the attributes that are selected. For example, if a Hopper 3 device is chosen and the first stage in the control and support pathway is associated to only VIP receivers, but the second stage in the control and support pathway is associated to a Hopper 3 device, then the control and support pathway will begin at stage two, since this is the first attribute matching stage.

In still another aspect of some embodiments, the context-driven voice-control system 100 enables a user who has recently been assisted via technical support portal to resume the control and support pathway that the user was last visiting to offer a streamlined experience for the user. For example, the system provides the option to resume the control and support pathway if the same user accesses the system for the same problem within 48 hours. In another example, if a user who was recently served by the context-driven voice-control system 100 returns within seven days and did not completed the previous control and support pathway, the system prompts the user to resume the previous control and support pathway.

Referring again to FIG. 4, components/modules of the receiving device 318, which is dynamically controlled by the context-driven voice-control system and method 100, and operation manager 422 are implemented using standard programming techniques. For example, the receiving device operation manager 422 may be implemented as a "native" executable running on the CPU 403, along with one or more static or dynamic libraries. In other embodiments, the receiving device 318 and operation manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 318 to perform the functions of the receiving device operation manager 422. In one embodiment, instructions cause the CPU 403 or some other processor, such as an I/O controller/processor, to: gather user attributes for use in a voice control session; receive a voice control request from a user during the voice control session; dynamically generate and present a list of available control and support pathways to a user based on the user attributes and the voice control request; in response to a vocal selection by a user of an available control and support pathway, present stages sequentially to the user, each stage having a list of actions that the user can select to facilitate resolution to the user's voice control request; in response to receiving a vocal selection of an action in the voice control session, update the stages sequentially presented to the user in the available control and support pathways to facilitate resolution to the user's voice control request; and in response to receiving a vocal selection of an action in the voice control session, send an authorization signal via an external system to perform a function related to the vocally selected action.

The embodiments described above may also use well-known or other synchronous or asynchronous client-server computing techniques. However, the various components may be implemented using more monolithic programming techniques as well, for example, as an executable running on a single CPU computer system, or alternatively, decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 422 implementation. Also, other functions could be implemented and/or performed by each component/module, and in different orders, and by different components/modules, yet still achieve the functions of the receiving device 318 and operation manager 422.

In addition, programming interfaces to the data stored as part of the receiving device 318 and operation manager 422 can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 416 and other data 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to, TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 422.

Furthermore, in some embodiments, some or all of the components of the receiving device 318 and operation manager 422 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

While various embodiments have been described herein above, it is to be appreciated that various changes in form and detail may be made without departing from the spirit and scope of the invention(s) presently or hereafter claimed.

The invention claimed is:

1. A method for context-driven voice-control using an application control interface, the method comprising:
gathering media content subscriber attributes related to media devices that control media content programming for use in a voice control session;
receiving a context-driven voice control request from a user during the voice control session to control a media device;
dynamically generating and presenting a list of available control and support pathways to a media content subscriber based on the media content subscriber attributes and the context-driven voice control request of that particular media content subscriber; wherein each combination of media content subscriber attributes and context-driven voice control requests generates different control support pathways and categories presented to the media content subscriber;
in response to a vocal selection by a user of an available control and support pathway, presenting stages sequentially to the user, each stage having a list of actions that the user can select to facilitate resolution to the user's context-driven voice control request;
in response to receiving a vocal selection of an action in the voice control session, updating the stages sequentially presented to the user in the available control and support pathways to facilitate resolution to the user's context-driven voice control request; and
in response to receiving a vocal selection of an action in the voice control session, sending an authorization signal via an external system to perform a media device control function related to the vocally selected action determined by media content subscriber attributes and the context-driven voice control request.

2. The method of claim 1, further comprising: enabling media content subscribers to control customer service activities related to live broadcast programming, recorded programming, streaming programming, and on-demand programming using vocal selection by the media content subscriber.

3. The method of claim 1, further comprising: enabling media content subscribers to control account management activities using vocal selection by the media content subscriber.

4. The method of claim 1, further comprising: enabling media content subscribers to control authentication to authorize changes to their account using vocal selection by the media content subscribers.

5. The method of claim 1, further comprising: enabling media content subscribers to control troubleshooting of equipment and system capabilities using vocal selection by the media content subscriber.

6. The method of claim 1, wherein media content subscriber attributes include one or more of packages subscribed to by the media content subscriber, tenure of the media content subscriber, payment history of the media content subscriber, and media content subscriber equipment undergoing troubleshooting.

7. The method of claim 1, further comprising: enabling media content subscribers add a support application via a voice assistant associated application store.

8. The method of claim 7, further comprising: after installation of the voice assistant associated application, authenticating the media content subscriber to enable account specific features.

9. The method of claim 1, further comprising: prompting media content subscribers with a standard greeting and asking media content subscribers to provide a description of a current issue of interest to the media content subscriber.

10. The method of claim 9, wherein receiving a vocal selection, by the media content subscriber, of an available control and support pathway, further includes receiving the vocal selection by the media content subscriber of a search result that most closely matches the current issue of interest to the media content subscriber.

11. A context-driven voice-control system using an application control interface, the system comprising:
one or more processors; and
a memory device storing a set of instructions that, when executed by the one or more processors, causes the one or more processors to:
gather media content subscriber attributes related to media devices that control media content programming for use in a voice control session;
receive a context-driven voice control request from a media content subscriber during the voice control session;
dynamically generate and present a list of available control and support pathways to a media content subscriber based on the media content subscriber attributes and the context-driven voice control request of that particular media content subscriber;
in response to a vocal selection by a media content subscriber of an available control and support pathway, present stages sequentially to the media content subscriber, each stage having a list of actions that the media content subscriber can select to facilitate resolution to the media content subscriber's context-driven voice control request;
in response to receiving a vocal selection of an action in the voice control session, update the stages sequentially presented to the media content subscriber in the available control and support pathways to facilitate resolution to the media content subscriber's context-driven voice control request; and
in response to receiving a vocal selection of an action in the voice control session, send an authorization signal via an external system to perform a function related to the vocally selected action determined by media content subscriber attributes and the context-driven voice control request.

12. The system of claim 11, wherein the memory device further stores a set of instructions that, when executed by the one or more processors, causes the one or more processors to: verbally lead the media content subscriber along a control and support pathway to resolve a customer service issue with sequential stages, each stage having a list of vocally selectable actions by the media content subscriber.

13. The system of claim 11, wherein the memory device further stores a set of instructions that, when executed by the one or more processors, causes the one or more processors to: enable the media content subscribers to skip stages or add additional stages based on logic defined by one or more of media content subscriber attributes and the vocal selections by the media content subscriber.

14. The system of claim 11, wherein the memory device further stores a set of instructions that, when executed by the one or more processors, causes the one or more processors to: record stages taken and actions selected by the media content subscriber on the control and support pathway, upon completion of the vocally selected control request and control and support pathway.

15. The system of claim 14, wherein the memory device further stores a set of instructions that, when executed by the one or more processors, causes the one or more processors to: leverage the record of stages taken and actions selected by the media content subscriber for future use with technical support to help expedite troubleshooting.

16. The system of claim 11, wherein if the media content subscriber's context-driven voice control request has not been resolved, the system provides escalation paths that include one or more of: present a customer support phone number, present a customer support email address, and offer to connect the media content subscriber with a live agent.

17. The system of claim 11, further comprising a context manager that manages permissions, wherein the permissions control the visibility of available control and support pathways to the media content subscriber and category visibility to the media content subscriber.

18. The system of claim 11, further comprising a context manager that manages logic sets, wherein the logic sets control action visibility to the media content subscriber.

19. The system of claim 11, further comprising a front end media content subscriber interface that enables media content subscribers to identify an appropriate control and support pathway that addresses a current issue of interest to the media content subscriber via browsing a list of available control and support pathways to the media content subscriber.

20. A method for context-driven voice-control using an application control interface, the method comprising:
  enabling a media content subscriber to initiate a voice control session;
  gathering media content subscriber attributes related to media devices that control media content programming for use in the voice control session;
  receiving context-driven voice control requests from a media content subscriber during the voice control session;
  executing a search and dynamically generating control and support pathways that are available to a media content subscriber based on the media content subscriber attributes;
  presenting a list of available control and support pathways to a media content subscriber based on the media content subscriber attributes of that particular media content subscriber;
  receiving a vocal selection, by the media content subscriber, of an available control and support pathway;
  after the available control and support pathways is vocally selected, presenting stages sequentially to the media content subscriber, each stage having a list of actions that the media content subscriber can select;
  in response to receiving a vocal selection of an action in the voice control session, updating the stages sequentially presented to the media content subscriber in the available control and support pathways; and
  in response to receiving a vocal selection of an action in the voice control session, sending an authorization signal via an external system to perform a function related to the vocally selected action determined by media content subscriber attributes and the context-driven voice control request.

21. The method of claim 20, further comprising: enabling media content subscribers to control customer service activities related to live broadcast programming, recorded programming, streaming programming, and on-demand programming using vocal selection by the media content subscriber.

22. The method of claim 20, further comprising: enabling media content subscribers to control account management activities using vocal selection by the media content subscriber.

23. The method of claim 20, further comprising: enabling media content subscribers to control authentication to authorize changes to their account using vocal selection by the media content subscriber.

24. The method of claim 20, further comprising: enabling media content subscribers to control troubleshooting of equipment and system capabilities using vocal selection by the media content subscriber.

* * * * *